July 21, 1964 S. BERGER 3,141,594

TAPE LIFTER FOR TAPE RECORDER

Filed May 4, 1962

2 Sheets-Sheet 1

INVENTOR.
Stanley Berger

BY Maxwell E. Sparrow

ATTORNEY.

INVENTOR.
Stanley Berger
BY Maxwell E. Sparrow
ATTORNEY.

United States Patent Office 3,141,594
Patented July 21, 1964

3,141,594
TAPE LIFTER FOR TAPE RECORDER

Stanley Berger, Brooklyn, N.Y., assignor to Auricord Corporation, Kings County, N.Y., a corporation of New York Filed May 4, 1962, Ser. No. 192,490
14 Claims. (Cl. 226—199)

This invention relates to tape recording machines, and particularly to improved tape control means in the tape transport devices of these types of machines.

The tape control means in presently existing tape recorders, consisting of rigid tape lifters, have several disadvantages. When the tape is lifted off the tape heads, the tape lifters hit the tape abruptly and tend to throw a loop from the original path. This loop is caused by the sudden impact of the rigid tape lifters against the tape causing the reels to spin inward or in reverse, and to throw some slack, causing loss of head contact.

When the aforementioned slack exists and the machine is re-started for either playback or for recording, the take-up reel begins first to wind up the loose tape until the slack has been taken up. This new impact tends to reverse the rotary motion of the take-up reel and a new slack occurs. Thus, an intermittent take-up motion occurs until all the slack is taken up and the "bouncing" has stopped. In other words, there is no smooth continuous movement of the tape, and the sound, either being recorded or played back, becomes distorted.

This separation between the sound heads and the tape which occurs during the slack period prevents efficient functioning in the record, playback, fast speed and stationary stages.

Another disadvantage of the slack condition is that it renders precise positioning of the tape against the tape head extremely difficult to achieve, when the high speed of the machine is used for the orientation of a sound position on the tape for cueing or editing.

Obviously, the noise which is caused by the tape slapping against the tape heads is highly unwelcome, and this kind of shock also tends to break the tape.

This invention overcomes these disadvantages by a simple, ingenious device.

The invention consists in such novel features, combinations and improvements of parts as may be shown and described in connection with the apparatus herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is an object of the present invention to provide for new and improved contrivances for controlling the tapes in the tape transport devices of tape recording machines.

It is a further object of the present invention to provide improved lifting means for lifting the tape off the recording head, playback head and/or erase head, used singly or in combination when the tape is advanced or rewound at high speed.

Another object of the present invention is to provide elastic, resilient or flexible tape lifting means for preventing the tape from losing its tension and from becoming slack when it is lifted off the tape heads.

Various further and more specific objects, purposes, features and advantages will clearly appear from the detailed description given below in connection with the accompanying drawings which form part of this specification and illustrate merely by way of example one embodiment of the device of the invention. In the following description and in the claims, parts will be identified by specific names for convenience, but such names are intended to be as generic in their application to similar parts as the art will permit. Like reference characters denote like parts in the several figures of the drawings.

Figures 1, 2:
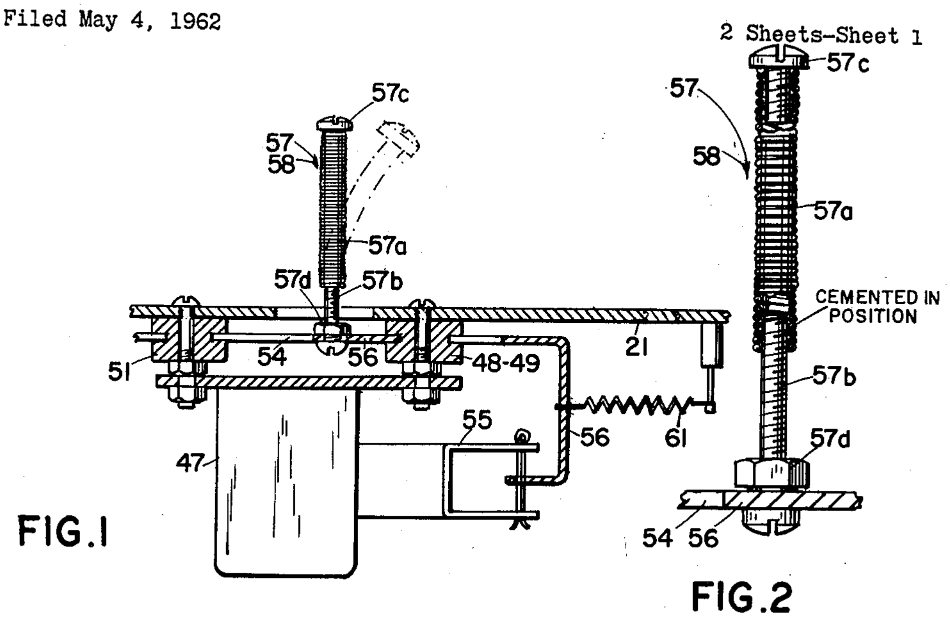
FIG. 1 shows the arrangement and the mounting of a tape lifting means, according to the invention.
FIG. 2 is an enlarged view of the tape lifter, partly shown in section.
Figure 3:
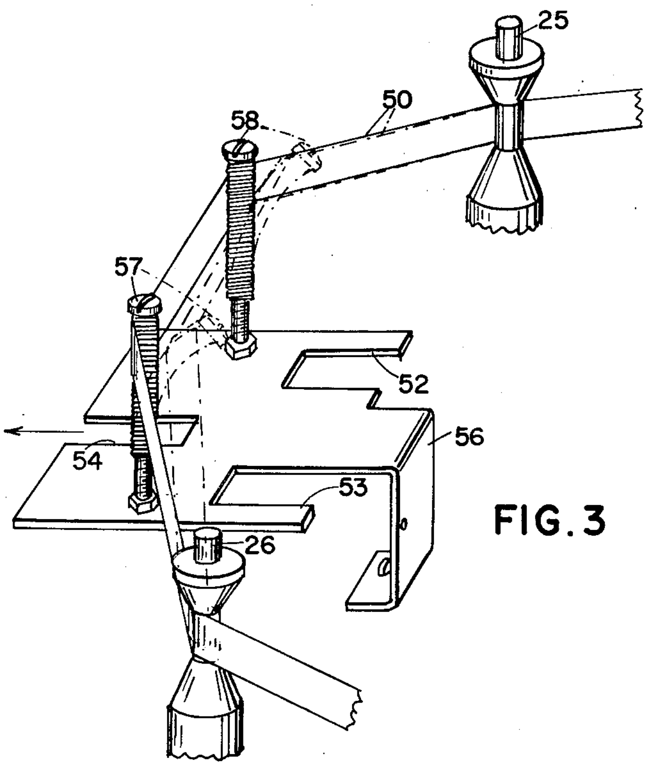
FIG. 3 is a schematic view in perspective of the general arrangement of the tape lifting means in conjunction with the tape.

Referring now in more detail to the drawing illustrating a preferred embodiment by which the invention may be realized, there is shown in FIGS. 1 and 3 a sliding plate 56 which is located underneath the tape deck 21 or panel of a tape recorder, as shown and described in co-pending application Serial No. 81,159 now Pat. No. 3,037,088 of which I am a joint inventor with Leonard Rosanblatt. A solenoid 47 is arranged underneath said sliding plate 56 and is secured to guide posts 48, 49 and 51 by nuts and bolts to the deck 21. The core 55 of the solenoid 47 is connected to the sliding plate 56, said sliding plate also having cut-outs 52, 53 and 54 so that this plate is being slidingly held by said guide posts 48, 49 and 51. The solenoid 47, through core 55, moves the sliding plate 56 horizontally back and forth.

Tape lifters 57 and 58 are fastened to the sliding plate 56 and extend through corresponding slots in the tape deck 21 so that the tape 50 may be guided over these tape lifters, which are positioned between stationary guide posts 25, 26 in such manner that the tape 50 is moving across the tape head 23 or heads of the tape recorder when the solenoid 47 is de-energized whereby the core 55 thereof is pulled back through sliding plate 56 by a return spring 61. In this position, the tape lifters 57, 58 are not in contact with the tape 50 and the tape recorder is operating, either recording, playing back, or stand by or "stop" position. Each one of these tape lifters 57, 58, as shown in FIG. 3, has an elastic flexible body **57*a* composed of a tightly wound spring material, preferably a helical spring. This helical spring is attached to a bolt 57*b* which, in turn, is fastened by a nut 57*d* to the plate 56. The open head end of the spring is closed by an inserted screw 57*c***.

It is obvious and understood that any other flexible, resilient or elastic material for the said tape lifters may be used, such as rubber, synthetic plastics in the shape of a solid or hollow, tube-like stick, or even a correspondingly shaped, polished leaf spring.

Figures 4, 5:
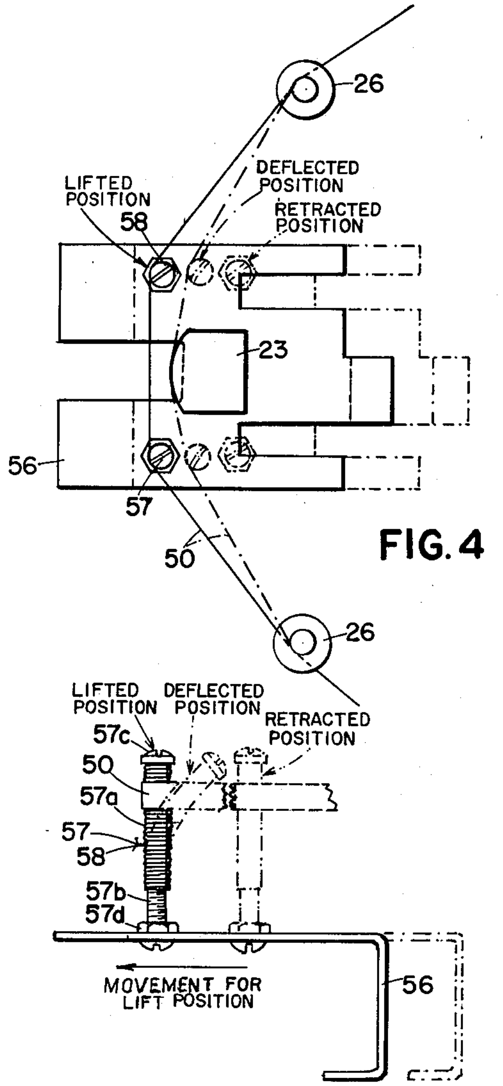
FIGS. 4 and 5 are diagrammatic views indicating different operating positions of the tape in relation to the flexible guide posts and tape head.

The operation of the elastic, resilient or flexible tape lifters may be described as follows:

In FIGS. 4 and 5, when the recorder is in the "stop" position, the tape lifters 57 and 58 are retracted and not in contact with tape 50, and the tape 50 is in contact with the head 23 or heads. When the recorder is put into fast speed, the tape lifters 57 and 58 are moved by the solenoid 47 in contact with the tape 50. At this instant, the tape lifters are deflected by the tape as shown in FIG. 5. As soon as the tension of the tape is decreased due to the change of differential force on each reel required for fast speed operation, the tape lifters will regain their vertical position causing the tape to be lifted from the sound heads. The movement of the flexible tape lifters from their point of deflection to their upright position is gentle and gradual so that the tape is not injured in any abrupt manner. This prevents tape breakage and any looping, slack or spilling of the tape, as well as protecting the tape head or heads of the recorder from excessive wear at the critical gap spacing. When the fast speed is terminated, the solenoid 47 is de-energized and the tape lifters are quickly retracted by spring 61, so that the tape is gently pulled back against the heads just prior to the termination of the fast speed, whereby the tension of the tape from the winding to the unwinding reel is maintained. This operating condition otherwise has been achieved by cam controls and/or electro-mechanical slow-down devices for the solenoid or even by mechanical linkages controlled by manual operation. The new device of this invention solves the problem by the most simple, efficient and extremely reliable, uncomplicated means.

It is intended that the word "recorder" used in the specification and claims be construed to include recorder, playback, combination recorder-playback, or like devices.

While the invention has been described and illustrated with respect to a certain particular preferred example which gives satisfactory results, it will be understood by those skilled in the art after understanding the principle of the invention, that various other changes and modifications may be made without departing from the spirit and scope of the invention, and it is intended therefore in the appended claims to cover all such changes and modifications.

I claim:

1. In a tape recorder or the like having at least one tape head, tape lifting means for lifting tape off said head, said tape lifting means comprising at least one resilient tape lifter, the resiliency of said tape lifter being such as to absorb the impact occurring when said tape lifter engages the tape thereby preventing slackening, breaking and stretching of the tape when said tape lifter is in operation and means for supporting said tape lifter.

2. Tape lifting means, according to claim 1, wherein said tape lifting means is movable and has means for moving said supporting means.

3. Tape lifting means, according to claim 1, wherein said supporting means is slidable and has means for sliding said supporting means.

4. Tape lifting means, according to claim 1, wherein said supporting means is reciprocal and means are provided for reciprocating said supporting means.

5. Tape lifting means, according to claim 1, wherein said tape lifter is substantially vertically disposed on said supporting means.

6. Tape lifting means, according to claim 1, wherein said tape lifter comprises an upright disposed on said supporting means.

7. Tape lifting means, according to claim 1, wherein said tape lifter comprises a close-wound helical spring.

8. Tape lifting means, according to claim 4, wherein said tape lifter comprises a close-wound helical spring.

9. Tape lifting means, according to claim 1, wherein said tape lifter comprises a helical spring.

10. Tape lifting means, according to claim 1, wherein said tape lifter comprises a leaf spring.

11. Tape lifting means, according to claim 1, wherein said tape lifter comprises a rubber member.

12. Tape lifting means, according to claim 11, wherein said member is hollow.

13. Tape lifting means, according to claim 1, wherein said tape lifter comprises a plastic member.

14. Tape lifting means, according to claim 13, wherein said member is hollow.

References Cited in the file of this patent

UNITED STATES PATENTS

| | | |
|---|---|---|
| 2,560,254 | Shickel | July 10, 1951 |
| 2,595,197 | Kuhlow | Apr. 29, 1952 |
| 2,975,242 | Fischer et al. | Mar. 14, 1961 |
| 3,042,753 | Iwamura | July 3, 1962 |

FOREIGN PATENTS

| | | |
|---|---|---|
| 148,052 | Australia | Sept. 4, 1952 |